United States Patent

[11] 3,572,747

[72] Inventors Hans Pollinger;
 Alfred Strohmer; Hans Kirchlechner,
 Munich, Germany
[21] Appl. No. 808,225
[22] Filed Mar. 18, 1969
[45] Patented Mar. 30, 1971
[73] Assignee Knorr-Bremse, GmbH
 Munich, Germany

[54] AIR SUSPENSION SYSTEM FOR VEHICLES
 10 Claims, 3 Drawing Figs.
[52] U.S. Cl. ................................................. 280/112,
 280/124, 105/197
[51] Int. Cl. ................................................... B60g 21/06
[50] Field of Search ........................................... 280/124
 (F), 112.1, 112; 105/165, 197

[56] References Cited
 UNITED STATES PATENTS
 3,154,320 10/1964 D'Avigdor .................... 280/112.1
 3,035,851 5/1962 Stengelin ..................... 280/112.1
 2,633,811 4/1953 Poage .......................... 105/164X

*Primary Examiner*—Philip Goodman
*Attorney*—Edmund M. Jaskiewicz

ABSTRACT: A vehicle having pneumatic bellows supporting both sides of the vehicle body is provided with a compressor which pumps air from the bellows on the inside of a curve to the bellows on the outside of a curve when the vehicle travels along a curved path. A valve system keeps the intake and discharge of the compressor open to the atmosphere when the vehicle is travelling in a straight line but is actuated in response to the angular acceleration of the vehicle about a vertical axis to connect the compressor intake and discharge to the bellows on both sides of the vehicle when the vehicle travels along a curved path. The compressor is driven from an axle of the vehicle through a speed responsive clutch so as to operate only when the vehicle travels above a predetermined speed. Level regulators are provided to regulate pressure in the bellows only when the vehicle travels in a straight line. A further level regulator is responsive to variations in the height of the longitudinal tilt axis of the vehicle.

INVENTORS
HANS POLLINGER
ALFRED STROHMER
HANS KIRCHLECHNER

ATTORNEY

AIR SUSPENSION SYSTEM FOR VEHICLES

The present invention relates to a pneumatic suspension system for vehicles, more particularly, to an arrangement for connecting the intake and discharge of a compressor to the supporting bellows on both sides of the vehicle body or to the atmosphere in response to the curvilinear or rectilinear travel of the vehicle.

A known pneumatic suspension system for vehicles comprises a compressor connected in series with a shutoff valve in a conduit interconnecting the two pneumatic supporting bellows on opposite sides of the vehicle. The compressor is driven by an electric motor whose starting, stopping and direction of rotation are controlled by pendulum actuated contacts. The shutoff valve is open only when the compressor is operating. The pendulum swings only in a direction transverse to the longitudinal axis of the vehicle. As the vehicle travels around a curve centrifugal force will cause the pendulum to swing outwardly and contacts will be actuated to connect the electric motor for rotation in the proper direction to operate the compressor to pump air out of the bellows on the inside of the curve and into the bellows on the outside of the curve. The height of the inside bellows will therefore decrease while the bellows on the outside of the curve will increase so as to tilt the vehicle body toward the inside of the curve. The compressor will continue to pump air until either the vertical axis of the vehicle body is parallel to the position of the pendulum or until a limit switch is actuated at the maximum tilt angle of the vehicle body.

Such an air suspension system, however, is unsatisfactory since it has a number of disadvantages. Since the electric motor starts only when the pendulum begins to swing after the vehicle enters a curve, both the electric motor and compressor must start under load. Accordingly, the electric motor does not deliver its full load until sometime after the vehicle enters the curve. Thus, the tilting of the vehicle body toward the inside of the curve will be correspondingly delayed. In order to compensate for such a delay, the compressor is provided with a large discharge capacity so that the compressor will be able to tilt the vehicle body the required distance in the shortest possible time after the compressor has started to operate. The electric motor must also be proportionately greater and will require additional electric current. During the time from the entry of the vehicle into the curve until the vehicle body has been tilted the desired distance to the inside of the curve passengers in the vehicle will be subjected to a centrifugal force toward the outside of the curve.

As the vehicle leaves the curve, the centrifugal force acting upon the pendulum decreases. However, if the vehicle body was at its maximum angle of tilt, then the pendulum will remain in a tilted position even as the centrifugal force decreases. Since the tilting forces exerted by the air bellows on the vehicle body remain constant while the centrifugal force acting upon the vehicle body decreases it will be apparent that the vehicle body will tend to tilt further toward the inside of the curve. As a result of this additional tilting and the decrease of the centrifugal force the pendulum will return from its tilted position to its midposition. During this movement of the pendulum there will still not be any movement of the vehicle body into its upright position. Only after the vehicle body continues to tilt so that the pendulum swings in the opposite direction will air be delivered from the bellows on the outside of the curve to the bellows on the inside of the curve. Here again there will be a delay in the starting of the compressor. Once the pumping of the air commences, the vehicle body will be returned to its original upright position. This repeated reversal of tilting of the vehicle body will subject the passengers to a centrifugal force toward the outside of the curve as a result of the limitation on maximum tilt of the vehicle and then to a force toward the inside of the curve. This action of the vehicle will be very unpleasant and uncomfortable to the passengers.

In such a system the pendulum is usually provided with a delayed response so that during brief lateral accelerations of the vehicle such as caused by irregularities in the road or in the case of railway vehicles by their sinusoidal movement along a straight line, the pendulum will not be responsive. This delayed response characteristic of the pendulum will further delay the control tilting of the vehicle body.

Another form of air suspension system for vehicles is provided with a laterally swinging pendulum to control the delivery of air to and from the bellows on the two sides of the vehicle body so that as the vehicle travels along a curvilinear path, the pressure in the bellows at the outside of the curve is increased while the pressure in the bellows on the inside is decreased. This control of pressure fluctuations in the bellows in response to the movement of a pendulum has the same inherent difficulties as described above. As a result, the system will require a greater quantity of compressed air and accordingly more energy for its operation.

It is therefore the principal object of the present invention to provide a novel and improved air suspension system for vehicles.

It is another object of the present invention to provide an air suspension system for vehicles wherein the vehicle body is tilted without delay in response to the vehicle travelling along a curved path.

It is a further object of the present invention to provide an air suspension system for road vehicles and rail vehicles which requires very little air pressure and therefore a small compressor that does not consume much energy.

The pneumatic suspension system for a vehicle according to the present invention may comprise pneumatic supporting bellows means on each side of the vehicle body. A compressor having an intake and a discharge is continuously driven from an axle of the vehicle at least when the vehicle travels above a predetermined speed. A plurality of shutoff valves are connected to the compressor intake and discharge and to the bellows means to open the intake and discharge to the atmosphere when the vehicle travels in a straight line. In response to the angular acceleration of the vehicle about a vertical axis the valves are actuated to connect the intake of the compressor with the bellows means on the vehicle side acted upon by the angular acceleration with respect to the front of the vehicle and the compressor discharge is connected to the bellows means on the other side of the vehicle. As a result, air is pumped from the bellows on the inside of the curve to the bellows on the outside of the curve.

In a modification of the above described system, there is provided an air suspension system that uses only shutoff valves with a first group of shutoff valves connected in a circuit between the intake, the bellows on one vehicle side and the atmosphere and a second group of valves connected in a circuit between the compressor discharge, the bellows on the other side of the vehicle and the atmosphere.

Other objects and advantages of the present invention will be apparent upon reference to the accompanying description when taken in conjunction with the following drawings wherein.

Proceeding next to the drawings wherein like reference symbols indicate the same parts throughout the various views, a specific embodiment and a modification of the present invention will be described in detail.

Figure 1:
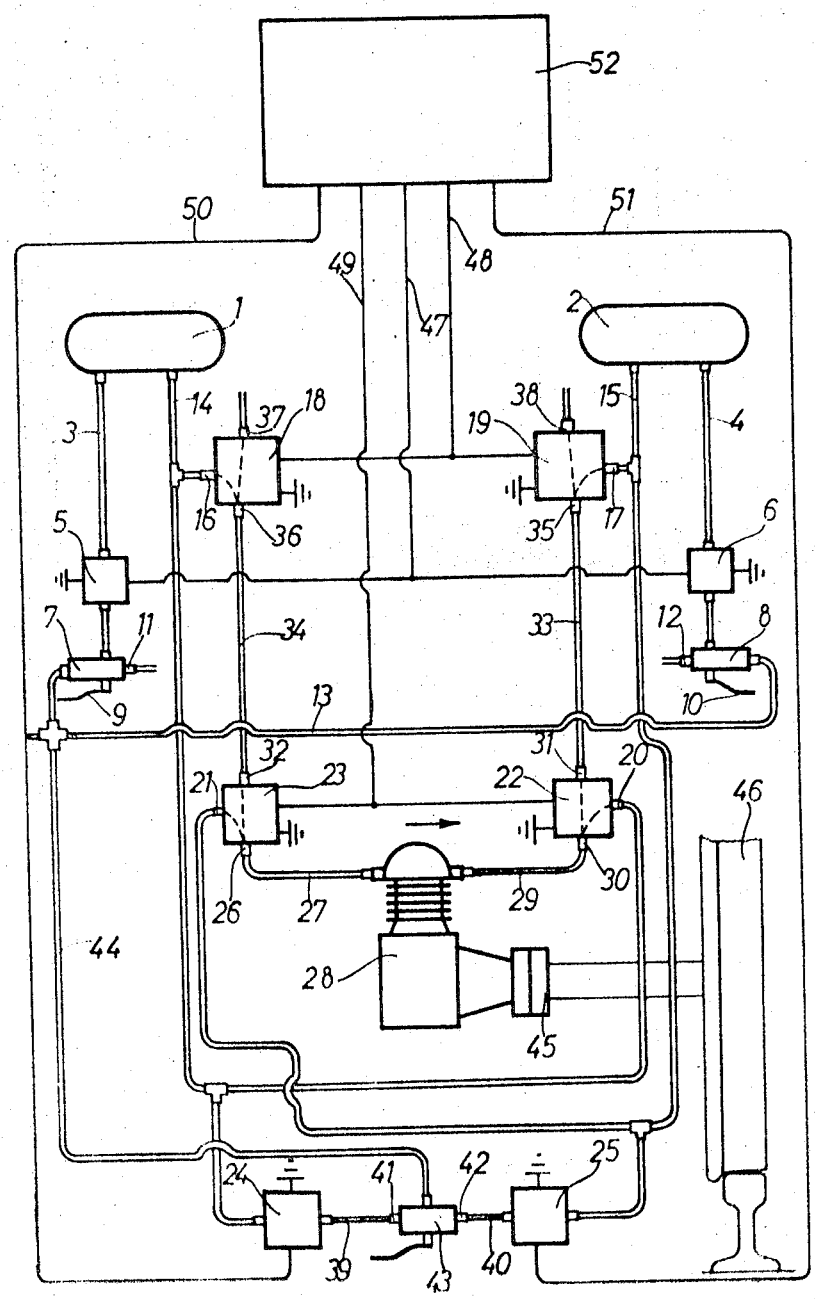
FIG. 1 is a schematic diagram of an air suspension system according to the present invention.

As may be seen in FIG. 1, the system according to the present invention comprises air suspension cushions or bellows 1 and 2 which are positioned on opposite sides of the vehicle body and are each connected by conduits 3 and 4 to magnetic controlled shutoff valves 5 and 6 and to level regulating valves 7 and 8. The valves 7 and 8 are mounted on the air-cushioned vehicle body and are actuated by levers 9 and 10 which are pivotally connected to the noncushioned vehicle frame. The level regulating valves 7 and 8 have air outlet ports 11 and 12 and have their inlets connected by a conduit 13 to a source of compressed air not shown in the drawing. Each level regulating valve 7 and 8 controls the admission of compressed air into the air bellows 1 or 2 upon its respective side when the height of the bellows is too low. The admission of compressed air is controlled by pivotal movement of lever 9 or 10 while the respective shutoff valve 5 or 6 is open. When the level of a bellows 1 or 2 is too high with respect to the vehicle frame, the corresponding level regulating valve 7 or 8 is operated by pivoting of the corresponding lever 9 or 10 to permit compressed air to escape into the atmosphere through the corresponding outlet 11 or 12. Shutoff valves 5 and 6 will remain open. The level regulating valves 7 and 8 therefore act to maintain the heights of the air suspension bellows 1 and 2 constant.

The suspension bellows 1 and 2 are also connected through tubular conduits 14 and 15 with branch connections 16 and 17 to magnetic two-way valves 18 and 19. Conduit 14 also connects to inlet 20 of a magnetic two-way valve 22 and conduit 15 connects to inlet 21 of a magnetic two-way valve 23. Conduit 14 is also connected to a magnetic shutoff valve 24 and conduit 15 connected to a magnetic shutoff valve 25.

The two-way valve 23 has an inlet 26 which is connected to the intake conduit 27 of an air compressor 28. The compressor 28 is provided with a discharge conduit 29 leading to an inlet 30 of the two-way valve 22. The outlet connections 31 and 32 of the two-way valves 22 and 23 are connected by conduits 33 and 34 with the inlet connections 35 and 36 of the two-way valves 19 and 18 respectively. The two-way valves 18 and 19 are also provided with outlets 37 and 38 which open to the atmosphere.

Shutoff valves 24 and 25 are provided with connecting conduits 39 and 40 which lead to regulating connections 41 and 42 of a third level regulating valve 43. The connections 41 and 42 can be pneumatically connected to each other through the level regulating valve 43.

The level regulating valve 43 is positioned in the central longitudinal plane of the vehicle so as to be responsive only to changes of elevation of the longitudinal tilting axis of the vehicle body but not by any tilting movements of the body about this longitudinal axis.

The air bellows used in supporting vehicle bodies often have the characteristic of having a volume which varies in a nonlinear relationship to the height of the bellows. Further, during actuation of the control system it is sometimes necessary to fill previously emptied air conduits by compressed air from a bellows. In addition, the compressor does not deliver all of the air that it is supposed to deliver because of the leakage of compressed air through its housing. Because of these reasons when the control apparatus is responsive to a curvilinear path there will be a variation in elevation of the axis about which the vehicle body is tilted by the bellows on its two sides. In order to avoid this undesirable change in the height of the bellows, the third level regulator is provided in the system of the present invention. This third level regulator is controlled by the level of the longitudinal axis of tilt of the vehicle body and functions to control the pressure in only those bellows which are on the outside of the curved path followed by the vehicle.

It is preferable that this third level regulating valve comprise a level regulator whose outlet is connected to the bellows on both sides of the vehicle through shutoff valves responsive to the curvilinear path of the vehicle.

The level regulating valve 43 is connected to a source of compressed air through a conduit 44.

The compressor 28 is driven through a speed responsive clutch 45 connected to the axle upon which is mounted a railway wheel 46. By driving the compressor from an axle of the vehicle it is possible to control the response and functioning of the curve responsive control with respect to the speed of the vehicle. This in turn results in obtaining an increase in the function as vehicle speed increases. The output of the compressor is then proportional to the speed of travel of the vehicle within a wide range. The tilting and the return to an upright position of the vehicle body will then be dependent on the speed of the vehicle as desired in the present invention.

The clutch coupling 45 is controlled by the speed of the vehicle in such a manner that ordinarily the clutch will remain disengaged but will be engaged automatically whenever the vehicle speed exceeds a predetermined value. This arrangement functions to save the compressor from operation during slow vehicle speeds when the compressor is not needed.

The solenoid coils of the magnetic shutoff valves 5 and 6 are both connected to an electrical control lead 47. In a similar manner, the solenoid coils of the the magnetic valves 18 and 19 are connected to control lead 48 and the solenoid coils of the two-way valves 22 and 23 are connected jointly to an electrical control lead 49. The solenoid coils of shutoff valves 24 and 25 are energized separately through the electrical leads 50 and 51 respectively. All of the two-way valves 18, 19, 22 and 23 while at rest in their normal position have their inlet connections 36, 35, 30 and 26 connected to their respective outlets 37, 38, 31 and 32. At rest, the shutoff valves 5 and 6 remain open whereas shutoff valves 24 and 25 remain closed while at rest.

The several electrical control leads 47, 48, 49, 50 and 51 lead to a control device 52 which is known in the art and not illustrated in detail. The control device 52 is responsive to turning movements or angular acceleration of the vehicle about a vertical axis, or may be made responsive to the inclination or tilting of the vehicle body. The control device may also include devices known in the art which are responsive to signal generators positioned along the tracks of railway vehicles. The control device 52 controls the connecting of control leads 47 to 51 to a voltage source in the manner presently to be described with reference to FIG. 2.

Figure 2:
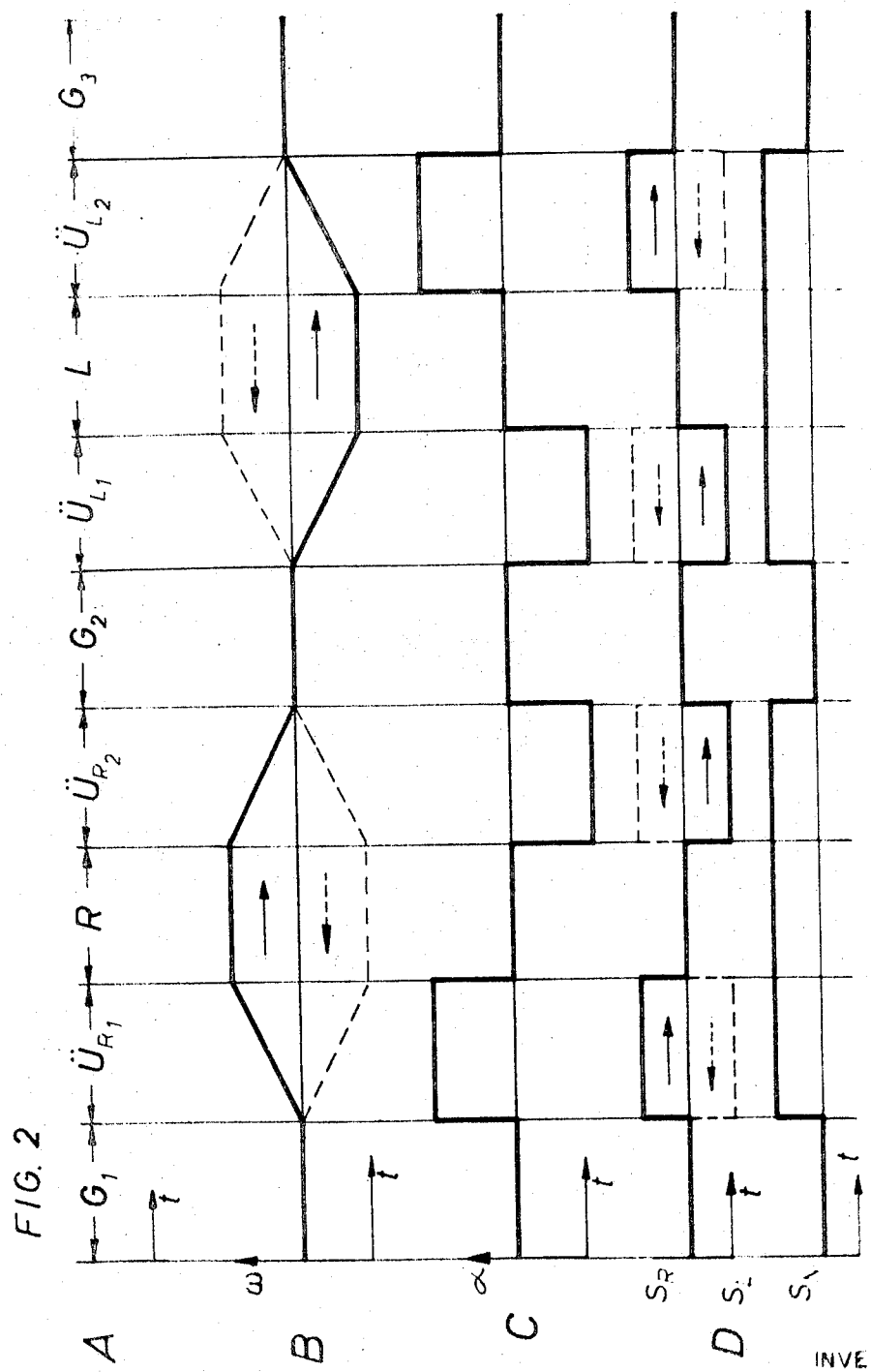
FIG. 2 is a graph illustrating the functioning of the system of FIG. 1.

In FIG. 2 there is indicated at A a sequence of operations of a vehicle incorporating the present invention as this vehicle travels along a path at a constant speed during the time $t$. The operation of the present invention will be described as applied to a railway vehicle travelling on rails but it is to be understood that the invention may also be employed with other vehicles such as road vehicles operating on roads.

In row A, $G_1$ indicates a straight path, $U_{R1}$ the beginning of a right turn, R the middle or constant radius portion of the right turn, $U_{R2}$ the end of the right turn and $G_2$ another straight portion of the path. After this straight path, $U_{L1}$ represents the beginning of a left turn, L the central portion of a left turn, $U_{L2}$ the end of the left turn and $G_3$ a final straight path or track. As the vehicle passes along the route defined in row A, the vehicle will undergo the turning speeds or angular velocities $\alpha$ as represented in row B and the angular accelerations $\alpha$ about a vertical axis as indicated in row C.

As the vehicle enters into a right turn the angular velocity $\omega$ will increase and there will be a constant angular acceleration $\alpha$. During the central portion of the curve the angular velocity $\omega$ will remain constant while the angular acceleration has decreased to zero. As the vehicle leaves the right turn $U_{R2}$ the angular velocity $\omega$ will decrease while the angular acceleration will be constant but will decrease to zero as the vehicle enters the straight path $G_2$.

As the vehicle proceeds through the left turn subsequent to straight track $G_2$, the events as described for the right turn will be repeated but in the reverse direction. Should the vehicle travel along the same path but in the opposite direction, namely from right to left in row A of FIG. 2, then the same angular accelerations $\alpha$ will occur as described above. However the angular velocity $\omega$ will be in the opposite direction as indicated by the dash lines in row B.

The control apparatus 52 has the characteristic that when the angular velocity of the vehicle attains the valve $\omega$ the control lead 47 (see FIG. 1) will remain connected to a source of electrical voltage during the duration of this velocity. In addition, control device 52 will connect control leads 50 or 51 to the voltage source depending on the direction in which the vehicle is turning. Assuming that bellows 1 as viewed in the direction of travel of the vehicle is on the left side and bellows 2 on the right side of the vehicle, the control device 52 in a right curve will connect control lead 50 and in a left curve the control lead 51 with the voltage source. As the vehicle travels along the route A indicated in FIG. 2, the control apparatus 52 will transmit control signals $S_N$ (indicated in row D in FIG. 2) to control lead 47 and to one of the control leads 50 or 51. As the vehicle begins to be subjected to angular acceleration $\alpha$, the control device 52 at the same time connects either control lead 48 or 49 (depending on the direction of travel of the vehicle) with the voltage source. Under the above described conditions, control device 52 will connect the voltage source with control lead 49 as the vehicle enters a right-hand curve and with control lead 48 as the vehicle leaves a right-hand curve, but with control lead 48 as the vehicle enters a left-hand curve and with control lead 49 as the vehicle leaves a left-hand curve. The connecting of these control leads in this manner generates the command signals for tilting the vehicle body to the right or to the left. In row D of FIG. 2, the control signals for tilting the vehicle body to the right are represented at $S_R$ and for tilting the vehicle body to the left at S L. During movement of the vehicle in the opposite direction as indicated by the dash lines in row D, the control device 52 will transpose or reverse the right and left tilting commands as indicated.

In the system as illustrated in FIG. 1, the control leads 47 to 51 are all disconnected from the voltage source when the vehicle travels along a straight path. The two-way valves 18, 23, 22 and 19 therefore connect the intake 27 and the discharge 29 of compressor 28 with the atmosphere at outlets 37 and 38. Shutoff valves 5 and 6 are open and shutoff valves 24 and 25 are closed. The pressure within the bellows 1 and 2 is therefore controlled only by the level regulating valves 7 and 8. The level regulating valve 43 is inoperative at this time.

When the vehicle and the compressor 28 driven by the vehicle axle moves into a right turn, the control device 52 will connect control leads 47, 49 and 50 with the voltage source. This will close shutoff valves 5 and 6; switch over two-way valves 22 and 23 and open shutoff valve 24. The level regulator valves 7 and 8 will thus be disconnected from the respective bellows 1 and 2 and the compressor 28 begins without any significant delay to pump air from bellows 2 through conduit 15, two-way valve 23 and intake conduit 27 and will pump the air through discharge conduit 29, two-way valve 22 and tubular conduit 14 to bellows 1. Accordingly, the height of bellows 2 will decrease while the height of bellows 1 increases to tilt the vehicle body to the right.

As the vehicle body reaches the angle of maximum tilt or the angular acceleration becomes zero, the control device will again disconnect lead 49 from the voltage source. This will have the effect of stopping the pumping of air from bellows 2 to bellows 1 because the intake and discharge conduits 27 and 29 will now be open to the atmosphere. The existing tilted or inclined condition of the vehicle body will be retained.

As a result of the nonlinear changes of volume of bellows 1 and 2 and the filling of the previously empty conduits with compressed air and leakage losses in compressor 28, there will generally be a lowering vertically of the longitudinal tilt axis of the vehicle body during the above described tilting operation. The lowering of the longitudinal tilt axis will open level regulating shutoff valve 43 to feed compressed air from supply conduit 44 into the conduits 39 and 40. Shutoff valve 24 which has not been opened will then deliver compressed air from conduit 39 through conduit 14 to bellows 1 until the longitudinal axis of tilt of the vehicle body has been raised up to its original level. When this level is reached valve 43 will close. During the travel of the vehicle through the constant radius portion of a right-hand curve, shutoff valves 5 and 6 will remain closed while shutoff valve 24 remains open.

As the vehicle comes out of the right-hand curve, control device 52 will immediately connect control lead 48 with the voltage source in response to an angular acceleration which was present in the opposite direction when the vehicle entered the right-hand turn. The control leads 47 and 50 will remain connected with the voltage source. Two-way valves 18 and 19 however, will be switched over to connect bellows 1 and 2 through conduits 14 or 15 and 34 or 33 and two-way valves 23 with the intake conduit 27 or the discharge conduit 29 of compressor 28. The compressor 28 will now pump air from bellows 1 to bellows 2. This action will return the vehicle to its upright vertical position. As soon as the angular acceleration experienced during the transition from the curvilinear to the rectilinear path has disappeared, the control device will disconnect control leads 47, 48 and 50 from the voltage source. The initial conditions will now be reestablished and the level control of the vehicle is now effected through the reopened shutoff valves 5 and 6 under the action of level regulating valves 7 and 8. The closing of shutoff valve 24 will render the level regulating valve 43 ineffective.

As the vehicle enters a left turn, the control device 52 will response to an angular acceleration $\alpha$ and will connect the control leads 47, 48 and 51 with the voltage source. The two-way valves 18 and 19 will now be switched over to connect the intake conduit 27 with bellows 1 and the discharge conduit 29 with the bellows 2. Compressor 28 will now pump air from bellows 1 into bellows 2 to tilt the vehicle body to the left. At the same time, shutoff valves 5 and 6 are closed and shutoff valve 25 is opened. As soon as the vehicle passes through the transition from rectilinear to curvilinear movement and enters the constant radius portion of the turn with maximum tilt of the vehicle body, the control device 52 will disconnect control lead 48 from the voltage source. The two-way valves 18 and 19 will now be switched to interrupt the flow of air from bellows 1 to bellows 2.

If there has been any lowering of the horizontal longitudinal axis of tilt of the vehicle body, the level regulating valve 43 will be opened to deliver compressed air from conduit 44, through conduit 40, open shutoff valve 25, and conduit 15 to bellows 2 until the longitudinal axis is raised to its requisite height. The level regulating valves 7 and 8 will remain inoperative during the time that the shutoff valves 5 and 6 are closed.

If the vehicle is subjected to any angular acceleration as the vehicle leaves the left curve, the control device 52 will connect lead 49 to the voltage source to switch over the two-way valves 22 and 23. The compressor will now pump the air from bellows 2 through conduit 15, two-way valve 23, intake conduit 27, discharge conduit 29, two-way valve 22, and tubular conduit 14 to bellows 1. This pumping will continue until the vehicle body returns to its vertical upright position or the vehicle has entered a straight portion of the path and the control device 52 thus disconnects control leads 47, 49 and 51 from the voltage source so as to return this system to its original condition.

The capacity of the compressor 28 is such that at different driving speeds and thus at different travel speeds of the vehicle, the compressor will always be able to deliver the necessary quantity of air from one of the bellows to the other bellows to tilt properly the vehicle body as the vehicle travels around a curve.

As a modification of the above described system, there can be provided an air suspension system using only conventional shutoff valves. These shutoff valves for making the necessary connections between the bellows, the compressor and the atmosphere are arranged in separate circuits connected to the intake and discharge conduits, to the bellows on both sides of the vehicle and to the atmosphere. Such a modified system is illustrated in FIG. 3.

Figure 3:
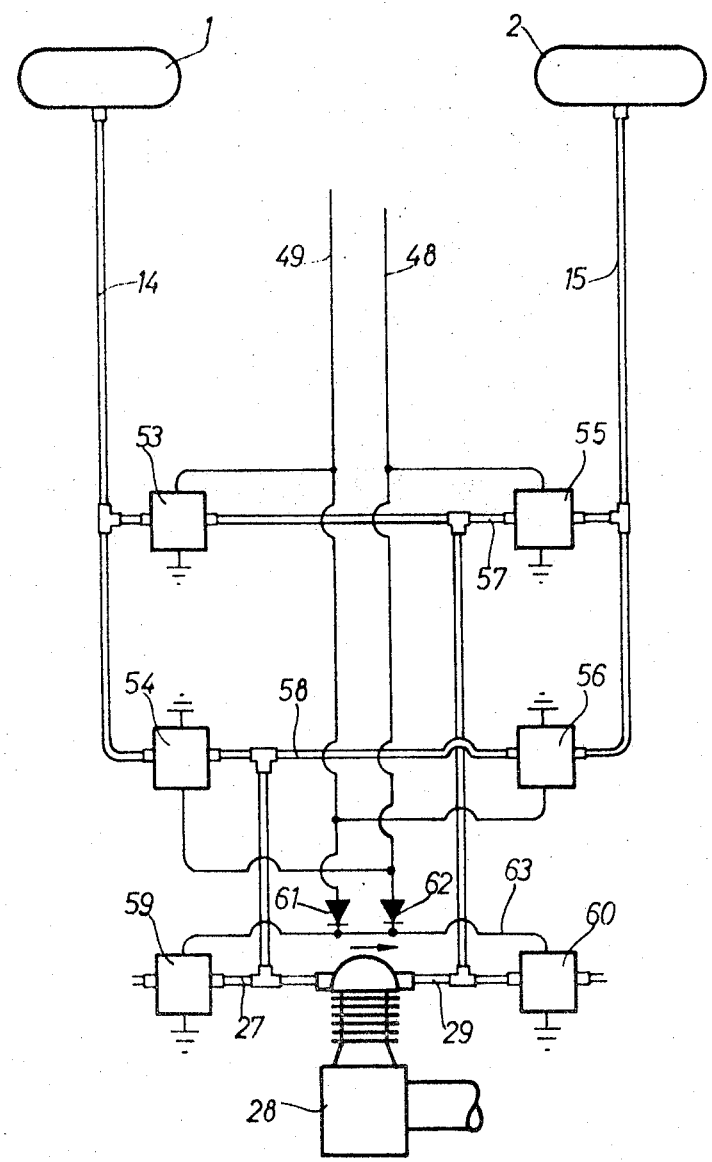
FIG. 3 is a schematic diagram of modified air suspension system.

It can be seen that in FIG. 3 bellows 1 is connected through the conduit 14 with magnetically actuated shutoff valves 53 and 54 known in the art. Similarly, bellows 2 is connected through conduit 15 to shutoff valves 55 and 56. The opposite connections of valves 53 and 55 are connected to each other by conduit 57 which in turn is connected to the discharge conduit 29 of compressor 28. In a like manner, the shutoff valves 54 and 56 have their opposite connections connected by conduit 58 which in turn is connected to the intake conduit 27 of the compressor. A magnetic shutoff valve 59 is connected between intake conduit 27 and the atmosphere and a magnetic shutoff valve 60 connected between the discharge conduit 29 and the atmosphere.

The magnetic shutoff valves 53 and 56 are both connected to the electric control lead 49 and the shutoff valves 54 and 55 are both connected to the electrical control lead 48. Diodes 61 and 62 are connected on their one sides to the leads 49 and 48 respectively with the other sides being both connected to an electrical lead 63 connected between the magnetic shutoff valves 59 and 60. Both of the control leads 48 and 49 are connected to a control device as in FIG. 1 and the remaining details of this modified system not shown in the drawings are the same as in FIG. 1. The shutoff valves 53, 54, 55 and 56 in their nonenergized condition remain closed whereas shutoff valves 59 and 60 in their nonenergized condition remain open.

When the electrical leads 48 and 49 are not connected to a voltage source, the intake conduit 27 and the discharge conduit 29 will both be connected to the atmosphere through shutoff valves 59 and 60 respectively. The compressor will therefore draw air from the atmosphere and discharge the air to the atmosphere.

When a voltage is introduced into lead 49, the shutoff valves 53 and 56 will be opened by current from diode 61 while shutoff valves 59 and 60 will be closed by the same current. Compressor 28 will then draw air from bellows 2 through conduit 15, through the open shutoff valve 56, conduit 58, and through the intake conduit 27 which has been shut off from the atmosphere by the closed shutoff valve 59. This same air will then be pumped through discharge conduit 29, conduit 57, open shutoff valve 53, and conduit 14 to bellows 1. The delivery of air under pressure to bellows 1 will cause the vehicle body to be tilted to the right.

When the lead 49 does not carry any voltage but lead 48 is connected to the voltage source, the shutoff valves 54 and 55 will be energized and the shutoff valves 59 and 60 will also be energized through diode 62. Compressor 28 will now draw air from bellows 1 through open shutoff valve 54, tubular conduit 58 and intake conduit 27 and will deliver the same air through discharge conduit 29, conduit 57 and the open shutoff valve 55 into bellows 2 to tilt the vehicle body to the left.

The diode 61 and 62 function of prevent the supplying of any voltage from one of the conductors 48 or 49 to the other if only one of these leads is connected to the voltage source. In all other respects the functioning of the modified system of FIG. 3 is the same as the system of FIG. 1.

This it can be seen that the present invention has provided a relatively simple air suspension system for road vehicles and railway vehicles which operates almost instantaneously in response to angular acceleration of the vehicle to tilt the vehicle to the left or right depending on the direction of curvilinear travel of the vehicle. When two-way valves are employed, two of these valves are connected in series between the atmosphere and the compressor intake and a second pair of valves are connected in series between the atmosphere and the compressor discharge. The valve in one series pair nearest the compressor and the valve in the other series pair furthest from the compressor are always connected to the bellows on one side of the vehicle. Further, the two-way valves which are respectively adjacent and remote the compressor are operable in unison. Thus four two-way valves are employed for pneumatically connecting the compressor, the bellows and the atmosphere.

In this air suspension system, the bellows on each side of the vehicle is provided with a level regulating device to prevent an undesired reacting tilt caused by the inclined position of the vehicle body while going around a curve. The level regulators on both sides of the vehicle body are provided with shutoff devices to permit pressure regulation in the bellows only while the vehicle travels in a straight line but will prevent any such pressure regulation while the vehicle travels along a curvilinear path. The shutoff devices may be in the form of shutoff valves connected between the level regulating valves and the respective bellows. These shutoff valves will remain closed while the vehicle travels along a curved path.

It will be understood that this invention is subject to modification in order to adapt it to different uses and conditions and, accordingly, it is desired to comprehend such modification within this invention as may fall within the scope of the appended claims.

We claim:

1. In a pneumatic suspension system for vehicles, the combination of pneumatic supporting bellows means on each side of the vehicle body, a compressor having an intake and a discharge and operating at least above a predetermined speed of the vehicle, valve means connecting said compressor intake and discharge and said bellows means for opening said intake and discharge to the atmosphere when the vehicle travels in a straight line, and means responsive to the angular acceleration of the vehicle about a vertical axis for actuating said valve means to connect said intake with the bellows means on the vehicle side acted upon by the angular acceleration with respect to the front of the vehicle and said discharge to the bellows means on the other side of the vehicle whereby air is pumped from the bellows on the inside of the curve to the bellows on the outside of the curve.

2. In a pneumatic suspension system as claimed in claim 1 wherein said valve means comprises a first pair of two-way valves connected in series to the compressor intake and a second pair of two-way valves connected in series to the compressor discharge, the valve in one pair nearest the compressor and the valve in the other pair furthest from the compressor being connected to the bellows means on one side of the vehicle body.

3. In a pneumatic suspension system as claimed in claim 2 wherein the two valves of said pairs nearest the compressor are actuable together and the other two valves of the pairs being actuable together.

4. In a pneumatic suspension system as claimed in claim 1 wherein said valve means comprises a first three shutoff valves in a circuit between the intake, the bellows means on one vehicle side and the atmosphere and a second three shutoff valves in a circuit between the discharge, the bellows on the other vehicle side and the atmosphere.

5. In a pneumatic suspension system as claimed in claim 1 and comprising a first level regulator means connected to the bellows means on one vehicle side and a second level regulator means connected to the bellows means on the other vehicle side, and means connected to said first and second level regulator means for operatively connecting said level regulator means to the respective bellows means only during rectilinear travel of the vehicle, said level regulator means being inoperative during curvilinear travel of the vehicle.

6. In a pneumatic suspension system as claimed in claim 5 wherein said connecting means comprises first and second shutoff valves, said shutoff valves being closed during curvilinear travel.

7. In a pneumatic suspension system as claimed in claim 5 and comprising a third level regulator means operable during curvilinear travel of the vehicle for controlling pressure in the bellows means on the outer side of the curvilinear path in response to the height of the axis of tilt of the vehicle.

8. In a pneumatic suspension system as claimed in claim 7 wherein said third level regulator means comprises a valve having a first outlet connected to the bellows means on one side of the vehicle and a second outlet connected to the bellows means on the other side of the vehicle, and first and second shutoff valves connected between the respective outlets and bellows means and operable in response to the curvilinear travel of the vehicle.

9. In a pneumatic suspension system for vehicles as claimed in claim 1 with said compressor being drivingly connected to an axle of the vehicle.

10. In a pneumatic suspension system as claim in claim 9 and comprising a speed responsive clutch drivingly connected between said compressor and a vehicle axle, said clutch being operable when the vehicle travels above a predetermined speed.